(12) United States Patent
Broberg

(10) Patent No.: US 9,049,431 B2
(45) Date of Patent: Jun. 2, 2015

(54) METHOD AND SYSTEM FOR GENERATION OF CAPTIONS OVER STEREOSCOPIC 3D IMAGES

(75) Inventor: David K. Broberg, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1421 days.

(21) Appl. No.: 12/651,273

(22) Filed: Dec. 31, 2009

(65) Prior Publication Data

US 2011/0157303 A1    Jun. 30, 2011

(51) Int. Cl.
*H04N 13/00* (2006.01)

(52) U.S. Cl.
CPC ............ *H04N 13/007* (2013.01); *H04N 13/004* (2013.01)

(58) Field of Classification Search
CPC .......................... H04N 13/007; H04N 13/004
USPC ............... 348/42–60, 589, 564, 468; 382/154
See application file for complete search history.

(56) References Cited

U.S. PATENT DOCUMENTS

| 2005/0089212 | A1* | 4/2005 | Mashitani et al. | 382/154 |
| 2009/0278986 | A1* | 11/2009 | Ikegami | 348/564 |
| 2010/0074594 | A1* | 3/2010 | Nakamura et al. | 386/92 |
| 2010/0157025 | A1* | 6/2010 | Suh et al. | 348/51 |
| 2010/0165083 | A1* | 7/2010 | Sasaki et al. | 348/51 |
| 2010/0188572 | A1* | 7/2010 | Card, II | 348/468 |
| 2011/0242104 | A1* | 10/2011 | Zhang et al. | 345/419 |

\* cited by examiner

*Primary Examiner* — Y Lee
*Assistant Examiner* — Richard Carter
(74) *Attorney, Agent, or Firm* — Great Lakes Intellectual Property, PLLC.

(57) ABSTRACT

A method and system is disclosed for generating a caption relative to a three-dimensional (3D) image. The caption may be generated such that it appears relative to a screen plane of an output device used to render the 3D image. The caption may be added to left and right viewpoint images included within images used by the output device to render the 3D image as a function of the positioning of the caption relative to the screen plane.

23 Claims, 4 Drawing Sheets

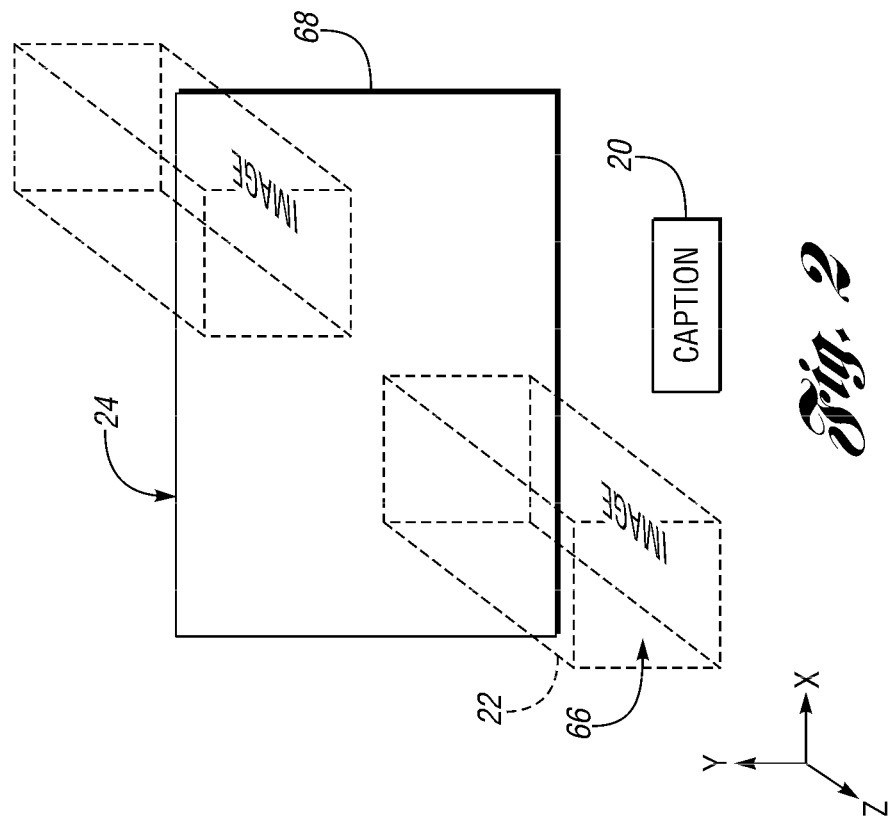
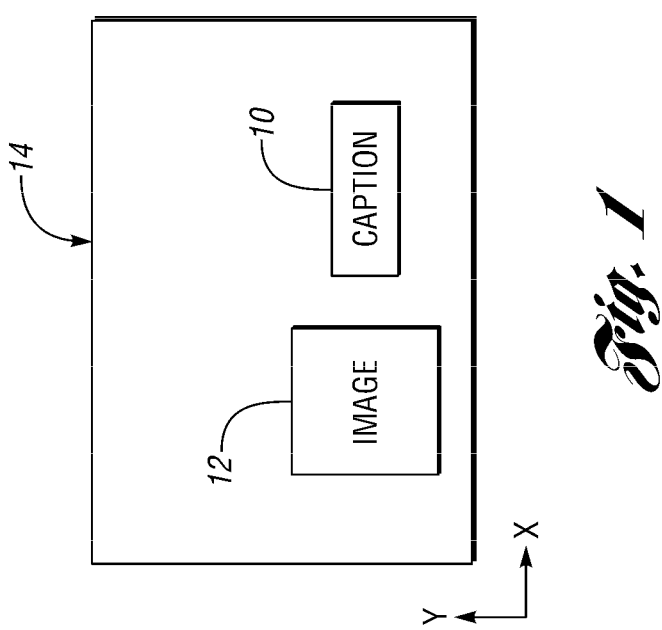

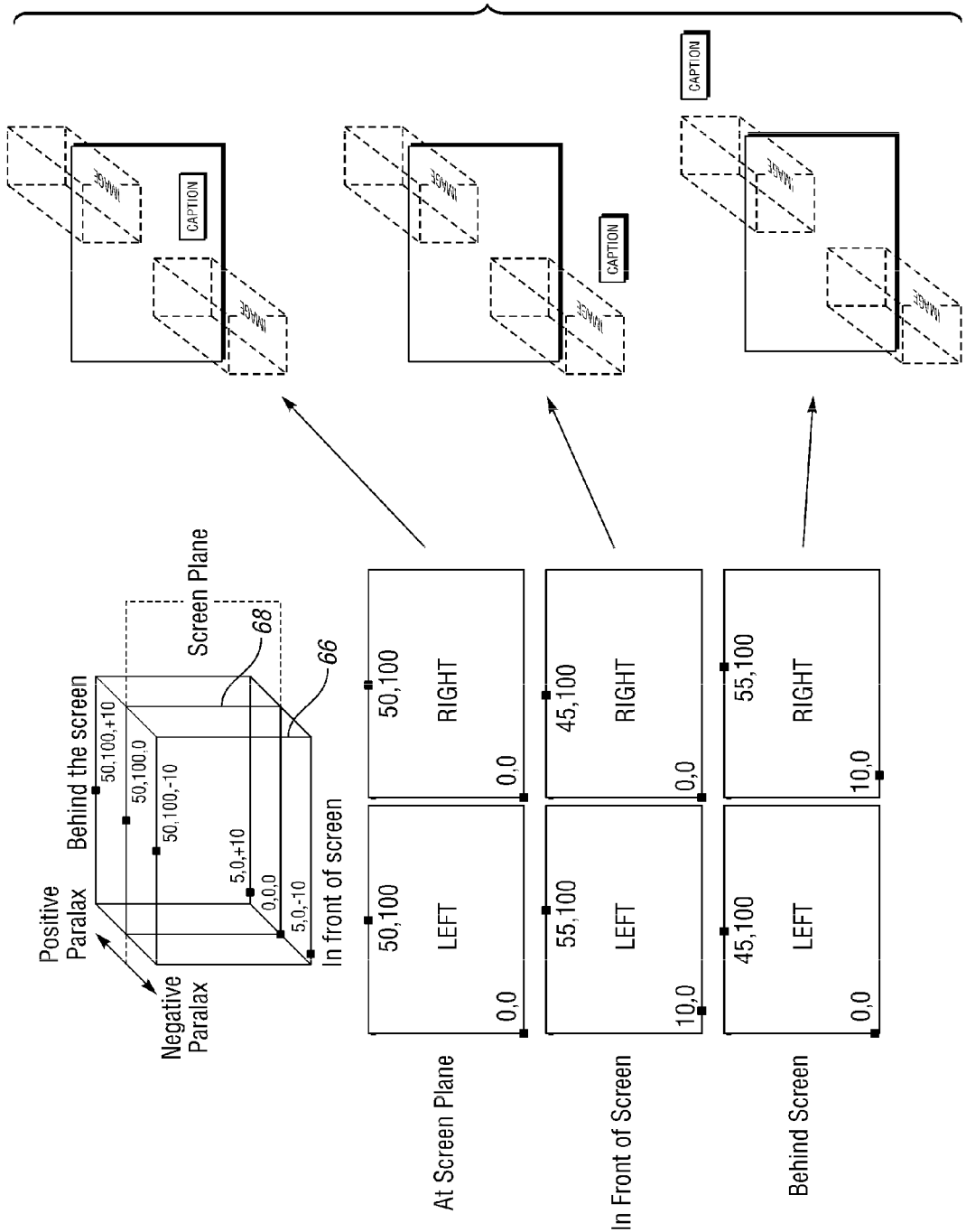

METHOD AND SYSTEM FOR GENERATION OF CAPTIONS OVER STEREOSCOPIC 3D IMAGES

BACKGROUND OF THE INVENTION

1. Technical Field

The present invention relates to methods and system for generating captions over three-dimensional (3D) images.

2. Background

FIG. 1 schematically illustrates display of a caption 10 over a two-dimensional (2D) image 12 included as part of a television program showing within a television screen 14. The illustration depicts a situation in which the caption 10 may be used to provide a textual description of a dialogue or other audio taking place within the television program. The caption 10 is shown to be at the side of the image 12 for exemplary purposes. The caption 10 may be directly over the image 12 to prevent viewing of the covered portion of the image 12. This process is commonly referred to as closed captioning when the caption 10 is used to textually describe audio events taking placing within the television program. The particular positioning of the caption 10 within the television screen 14 may be defined according to an x-axis and y-axis of the screen 14 in which the caption 10 is to appear, i.e., x and y values may be used represent a placement location of the caption 10 respectively within the x-axis and y-axis of the screen 14, such as the placement defined according to ANSI-CEA-708, which is hereby incorporated in its entirety. The caption 10 is then added to the video frames used to render the image 12 at the location specified with the 2D coordinates. This type of 2D placement coordinate may work well for placing the caption 10 relative to 2D images but is problematic when used to place the caption 10 near 3D images.

The rendering of 3D images is typically accomplished in a stereoscopic manner by rendering separate left and right viewpoint images such that the images from each viewpoint appear independently to each eye as a 3D object. Since a caption 10 added according to the 2D coordinate system will be added to part of the left viewpoint portion of the frame and part of the right viewpoint image of the frame, the 3D television displays the left and right viewpoint images independently such that only the portion of the caption 10 within each viewpoint is displayed at the same time. This essentially creates a 3D image that overlaps the two portions, rendering the closed caption text illegible.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 schematically illustrates a caption displayed over a two-dimensional (2D) image;

FIG. 2 illustrates a caption displayed over a three-dimensional (3D) image in accordance with one non-limiting aspect of the present invention;

FIG. 5 illustrations a parallax relation of a caption generated in accordance with one non-limiting aspect of the present invention.

DETAILED DESCRIPTION OF THE PREFERRED EMBODIMENT(S)

FIG. 2 illustrates a caption 20 displayed over a three-dimensional (3D) image 22 shown within a display 24 in accordance with one non-limiting aspect of the present invention. The caption 20 may be generated such that it appears to be parallel with or in front of the 3D image 22. This presentation is believed to be advantageous in that it allows a viewer to see the caption without the caption disrupting the presentation of the 3D image 22. (The caption 20 is shown to be at a side of the image for exemplary purposes. The present invention fully contemplates an area behind the caption 20 including 3D images.) The caption 20 may be redrawn to appear in each of the left and right viewpoint portions of each video frame prior to output such that the entire caption appears regardless of whether the left or right viewpoint is currently showing.

Figure 3:
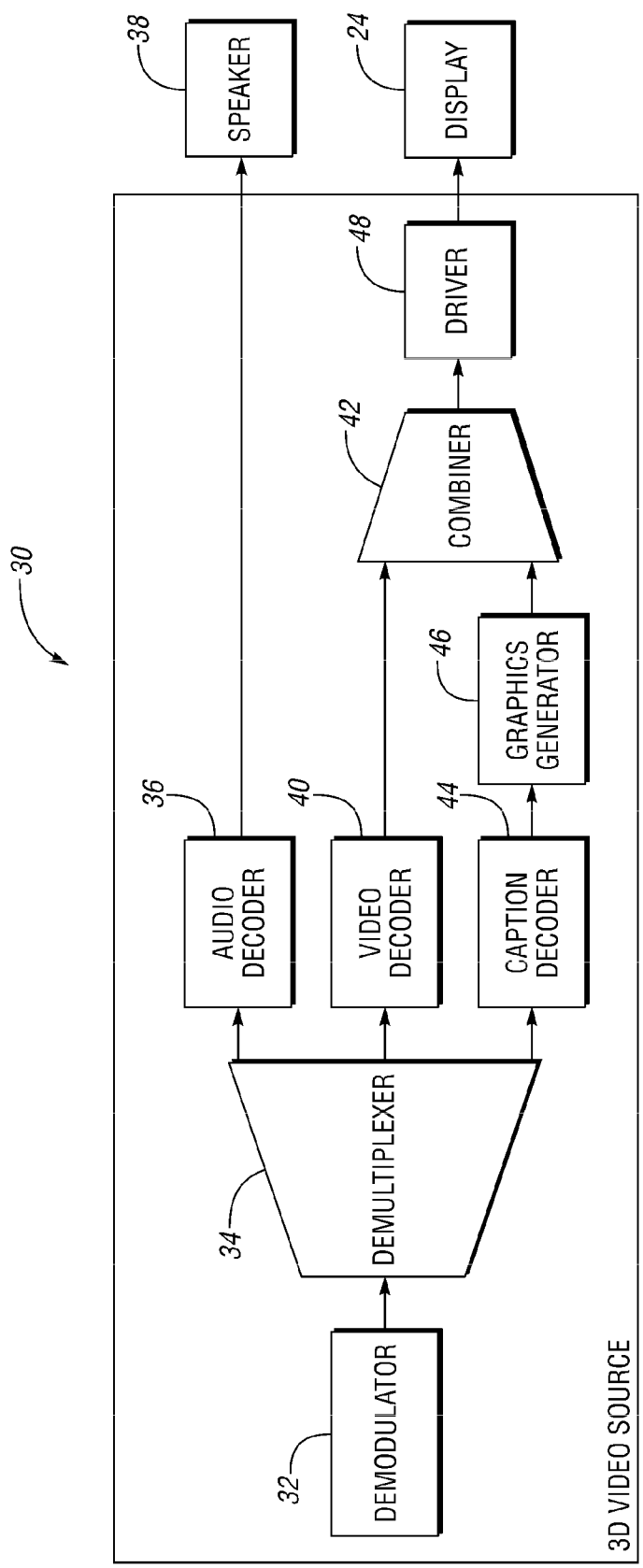
FIG. 3 illustrates a 3D video source configured to generate a caption in accordance with one non-limiting aspect of the present invention.

FIG. 3 illustrates a 3D video source 30 configured to generate the caption 20 in accordance with one non-limiting aspect of the present invention. The operation of the source 30 is described with respect to supporting output of 3D images to the display 24 of the type that relies on a stereoscopic presentation of left and right viewpoints, such as that provided by a settop box (STB), Blue-Ray player, etc. The source 30 may be configured to support generating the caption 20 during playback of a television program or other video based image. While the present invention is predominately described with respect to generating the caption over 2-view stereoscopic 3D television images, the present invention is not intended to be so limited and fully contemplates generating the caption 20 relative to any other type of 3D image, including multiview, autostereoscopic 3D images.

The source 30 may include a demodulator 32 to demodulate signals received from a service provider (not shown), disc/media player, or other source of content. The service provider may be a multiple system operator (MSO) or other entity that provides subscription based services to one or more subscribers, such as but not limited to a cable, satellite, or broadcast television service provider; a telephone/telephony service provider; and/or a high-speed data service provider. The source 30 also applies to an arrangement where the demodulator 32 may be configured to operate with some form of packaged media or removable memory element such as a BD player in which the demodulator function may differ depending upon the source of the content. The captions 20 generated according to the present invention may be adapted to the service associated with each service provider and the user interface devices necessary to access the same. In the case of supporting television based signaling, the demodulator 32 may be a tuner or other device configured to demodulate signals received over the particular communication medium of the television service provider, i.e., wireline (cable) or wireless (satellite, broadcast) mediums.

A demultiplexer 34 may be included downstream of the demodulator 32 to demultiplex the signals output from the demodulator 32. Television signals may be transported according to any number of communication protocols and standards. Moving Pictures Expert Groups (MPEG) is one standard that may be used to facilitate transmission of television based video. MPEG defines transportation of multiple element elementary streams (ESs) within a single transport stream (TS). In the case of supporting MPEG or some other multiplexed communication strategy, the demultiplexer 34 may be configured to demultiplex one or more of the ESs included in the TS output from the demodulator. For illustrative purposes, only ESs associated with audio, video, and captions are shown even though the system 30 may be configured to demultiplex and process other ESs.

An audio decoder 36 may be included to process the audio signals for output to a speaker 38. A video decoder 40 may be included to process the video signals for output to a combiner 42. A caption decoder 44 may be included to process caption signals for output to a graphics generator 46. The graphics generator 46 may be configured to generate textual or other graphical representation to be included as part of the caption 20. In the case of closed captioning, the graphics generator 46 may be configured to generate text that matches audio sounds being conveyed during the television program. This graphical representation may be based on corresponding data included with the caption signals transported to the source 30, i.e., based on data included in the caption ES of the TS such as that defined by ANSI/CEA-708. The graphics generator 46 may also be configured to generate graphical elements, text, advertisement, logos, and other types of graphical icons according to the design of user-interface and other application software in the source 30.

The combiner 42 may be configured to combine the output of the graphics generator 46 with the video output from the video decoder 40. A driver 48 may then interface the video with the display used to render the 3D image. Depending on the configuration of the display 24, the device driver 48 may be required to output the resulting video such that each frame includes a particular orientation of left and right viewpoint images, i.e., the device driver may be required to output the video according to a spatial reduction technique (side-by-side, above-and-below, checkerboard, etc.), in temporal reduction technique, or some other spatial reduction technique. The device driver 48 or the combiner 42 may include a 3D pre-formatting element (not shown) to facilitate the processing and reformatting of left and right viewpoint images as transmitted into different formats of spatially multiplexed or temporally multiplexed video frames as required by the display 24.

Figure 4:
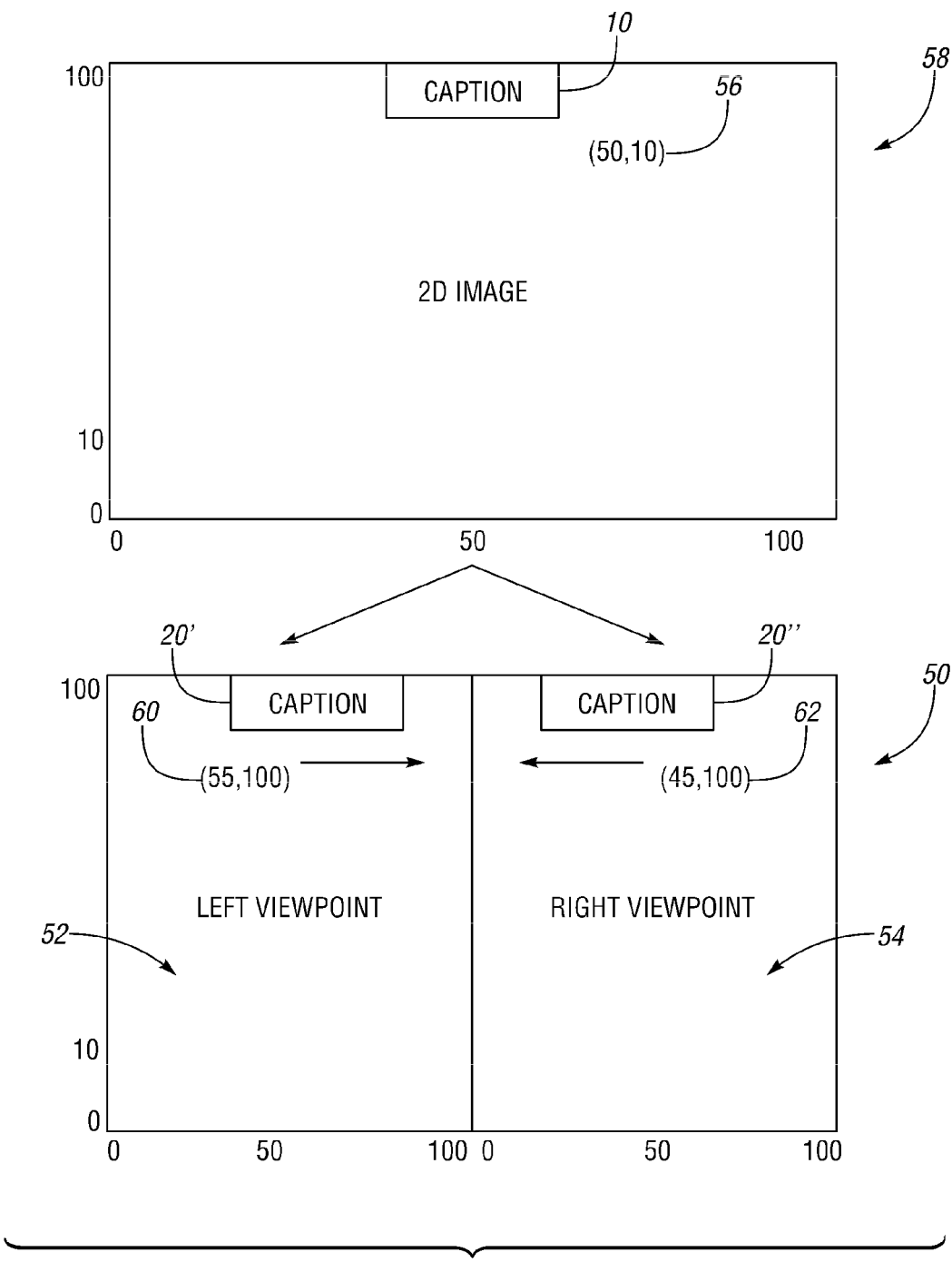
FIG. 4 illustrates a video frame output in accordance with one non-limiting aspect of the present invention.

The combiner 42 may be configured to add/combine the caption output from the graphics generator 46 to each of the left and right viewpoint images included within each video frame output to the display 24. FIG. 4 illustrates a video frame 50 output from the combiner 42 after redraw of the caption 20 in accordance with one non-limiting aspect of the present invention. The video frame 50 in the example is configured to operate with the display 24 requiring a side-by-side spatial reduction of left and right viewpoint images 52, 54. The caption 20 is redrawn to appear in both of the left and right viewpoint images 52, 54 based on a 2D coordinate placement 56 specified within the caption 20 information included with the TS, i.e., with the caption ES. A 2D image frame 58 included in the upper portion of FIG. 4 to illustrate placement of the caption 10 if the caption 10 were to be added to 2D video being output to a 2D display.

The placement of the captions 20 redrawn in accordance with the present invention may be adjusted relative to the 2D placement coordinates 56 used with the 2D video frame. For the purpose of one non-limiting aspect of the present invention, it is assumed that the captions 20 used were created using the present (2D) caption standards, without any special ability to convey placement other than in the 2-dimensional axis (X:Y), no Z-axis data is available in the caption stream. To create the appearance shown in FIG. 2 where the caption 20 appears to be in front of the 3D image 22, the left viewpoint caption 20' is shifted to the right and the right viewpoint caption 20" is shifted to the left. The caption 20' redrawn within the left viewpoint image 52 may be assigned a corresponding first placement location 60 and the caption 20" redrawn within the right viewpoint image 54 may be assigned a corresponding second placement location 62. The graphics generator 46 may use these placements 60, 62 when generating the caption video output to the combiner 42 for combination with the video output form the video decoder 40. The amount by which each caption 20', 20" is shifted may be selected depending on a forward end 66 (see FIG. 2) of the image plane so that the resulting caption 20 appears to be in front of the 3D images 22. This determination may be based on the characteristics of the display 24 and its operating capabilities. Optionally, the graphics generator 46 and/or the combiner 42 may be configured to assess these characteristics and to select an appropriate adjustment to the placement locations 60, 62.

The adjustments made by the present invention may be understood relative to the x and y coordinate values 56 typically used to define placement of the caption 20 within the 2D image frame 58. The x and y values 56 associated with that caption 20 may be used to define of an x-axis and y-axis placement location 60, 62 for a window or other feature used to display the caption 20. In accordance with the present invention, these x and y values 60, 62 may be adjusted to re-position a copy of the caption 20', 20" within the left and right viewpoint, spatially reduced video frames 52, 54 so that the resulting caption 20 appears to a viewer to be in front of a screen plane 68. FIG. 5 illustrations this relation as defined relative to a z-axis (positive parallax and negative parallax) as measured from the screen plane 68 relative to the viewer. The parallax of the caption 20 may be increased by controlling the relative offset of each of the redrawn captions 20', 20" to each other, i.e., the depth may increase (caption moves closer to viewer) as the captions 20', 20" are shifted farther away from the predefined 2D coordinates 56.

The 2D coordinates 56 used to define placement of the caption 10 relative to a 2D image (see FIG. 4) may be defined relative to a 100 unit coordinate system such that placement of the caption 10 approximately corresponds with an x value of 50 and a y value of 100. This would place the caption 10 at a top, center of the screen when output at the screen plane. Since the 3D video frame is used to generate separate full-images for each of the left and right viewpoints, the same 100 unit coordinate system is reproduced within each half of the side-by-side reduction. (The size of the caption 20', 20" may be corresponding adjusted to reflect the halving necessary to support the illustrated spatial reduction.) In a temporally reduced system, the reproduction of the same coordinate system within the illustrated halves would not be necessary since the entire frame would be used to represent one of the left or right viewpoint images 52, 54.

Regardless of whether left and right viewpoint images 52, 54 are temporally, spatially or otherwise reduced according to the needs of the output device, the placement of the captions 20', 20" within each of the left and right viewpoint images 52, 54 may be shifted relative to each other in accordance with the present invention to adjust the resulting appearance of the caption 20 relative to the produced 3D images 22. As shown in FIG. 4, the x values are the only adjusted value and each value is adjusted to produce a difference of 10 units between each caption depending on whether a negative or positive parallax of 10 units along the z-axis is desired. The amount of parallax may be selected by the graphics generator 46 based on the parallax of the 3D images being shown. This may include the graphics generator fixing the parallax through an entire program and/or continuously/dynamically adjusting the parallax with changes in parallax of the 3D images being shown, adjusting the parallax according to user inputs, and/or adjusting the parallax according to other messages send to the graphics generator.

As supported above, the present invention relates to a solution for generating captions (or graphics) over spatially multiplexed stereoscopic 3D images. This may include supporting caption placement within a system that relies on transmission of separate left and right viewpoints to construct a stereoscopic image. One solution proposed by the present invention is to redraw the text twice within each of the two sub-pictures, once for the left-eye half and again for the right-eye half of the image. Now when the two half images are processed by the 3D display processor they both contain the full text information for each eye, making them fully readable again. In this solution, when the captions are placed at the screen plane (zero parallax) there is no problem for portions of the image with positive parallax, however, when the captions are placed at the screen plane that intersect portions of the picture with negative parallax, there may be a depth conflict (visual paradox), which may negatively influence the 3D effect. The use of captions in this way may negatively influence the 3D effect and any extended exposure to this type of depth conflict may cause headaches and eyestrain. One solution proposed by the present invention is to render the captions in Z-space so that they appear to float in front or behind of any elements of the stereoscopic content. This may be accomplished by shifting the generated graphical (or text) elements in opposite directions for each half of the multiplexed stereoscopic image.

The text (or graphic overlay) that appears on the left-eye view may be shifted horizontally to the right while the text (or graphic overlay) for the right-eye view may be shifted to the left an equal amount away from the assigned target location. The degree or magnitude of this offset may be proportional to the resolution of the screen and the projected size of the image. The exact value may be adjusted with a user-control for the most comfortable viewing, while still minimizing the edge conflicts with any portion of the content that experiences negative parallax. Alternatively, a separate depth signal may be provided with the caption stream, which may be used by the display generator to control the off-set of the respective left and right text images, and/or data associated with multiple 2D coordinates specified for different placement locations may be processed to generate a desired z-depth according to relative differences in the specified 2D placement locations.

The present invention may be advantageous in that it may enhance the delivery a high-quality stereoscopic 3D experience to those viewers who chose to utilize the on-screen display of closed-captions during the program. Another non-limiting aspect of the present invention contemplates providing "open-captions" on a separate program stream that could be selected by the viewer where the caption text has been properly placed in the 3D space in advance by the programmer and delivered as a separate file. While this alternate method may be effective for stored content, it may less applicable to live programming and it may cost more to support transmissions of a duplicate stream.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of generating a caption over a multiplexed, stereoscopic 3D image comprising:
   determining a desired amount of parallax for the caption;
   determining initial x and y positional values for the caption from signaling used to transport the multiplexed, stereoscopic 3D image, the initial x and y positional values specifying positioning of the caption for two-dimensional (2D) output such that the initial x and y positional values are provided without conveying placement of the caption within any of a plurality of left viewpoint and right viewpoint images used by an output device to render the 3D image;
   adding the caption to each of the plurality of left viewpoint and right viewpoint images after determining the initial x and y positional values such that the caption added to the left viewpoint image, referred to as a left caption, is shifted relative to the initial x and y positional values and the caption added to the right viewpoint image, referred to as a right caption, is shifted relative to the initial x and y positional values, the left caption and the right caption being shifted in proportion to the desired amount of parallax;
   the initial x and y positional values specifying placement of the caption at a two-dimensional (2D) location within a screen of the output device used to render the 3D image, the screen defined by an x-y coordinate system where an x-axis defines a width of the screen and a y-axis defines a height of the screen, the initial x positional value defining the 2D location of the caption within the x-axis and the initial y positional value defining the 2D location of the caption within the y-axis; and
   shifting the left caption to appear at a first location within the x-y coordinate system and the right caption to appear at a second location within the x-y coordinate system such that:
   (i) the first location is different from the second location;
   (ii) the first location is different from the 2D location; and
   (iii) the second location is different from the 2D location.

2. The method of claim 1 further comprising shifting the left caption rightwardly relative to the 2D location and the right caption leftwardly relative to the 2D location by an equal amount in the event the desired amount of parallax is negative, thereby causing the caption to appear in front of a screen plane of the screen.

3. The method of claim 1 further comprising shifting the left caption leftwardly relative to the 2D location and the right caption rightwardly relative to the 2D location by an equal amount in the event the desired amount of parallax is positive, thereby causing the caption to appear behind a screen plane of the screen.

4. The method of claim 1 further comprising at least one of:
- determining the desired amount of parallax such that the caption appears in front of a screen plane of the screen or behind the screen plane;
- determining the desired amount of parallax such that the caption appears in front of the 3D image;
- determining the desired amount of parallax from user inputs to the output device;
- determining the desired amount of parallax from analysis of the relative offsets between the left and right viewpoint video images; and
- determining the desired amount of parallax from depth data provided with the video or caption signals.

5. The method of claim 1 further comprising determining the initial x and y positional values from placement information defined according to ANSI-CEA-708.

6. The method of claim 1 further comprising shifting the left caption and the right caption by an equal amount.

7. The method of claim 6 further comprising determining the equal amount prior to receiving the multiplexed, stereoscopic 3D image.

8. The method of claim 1 further determining initial x and y positional values for the caption form information transmitted as part of a 2D caption standard, the 2D caption standard relating the initial x and y positional values to the x-axis and the y-axis, the information being provided without z-axis data.

9. A method of including a caption within a video feed used by a display device to render stereoscopic, three-dimensional (3D) video, the method comprising:
- receiving 3D video frames within a transport stream wherein separate video frames are provided for a left viewpoint image and a right viewpoint image;
- defining a first location for the caption within the left viewpoint video image and a second location for the caption within the right viewpoint video image, the first and second locations each being different than predefined two-dimensional (2D) coordinates specified for the caption within the transport stream;
- combining the caption with each of the video frames such that a combination thereof forms at least part of the video feed used by the display device to render the stereoscopic, 3D video, wherein the caption is combined within each of the left and right viewpoint video frames at the correspondingly defined first and second locations;
- the predefined 2D coordinates specifying an initial x positional value and an initial y positional value for placement of the caption at a two-dimensional (2D) location within a screen of the display device, the screen defined by an x-y coordinate system where an x-axis defines a width of the screen and a y-axis defines a height of the screen, the initial x positional value defining the 2D location of the caption within the x-axis and the initial y positional value defining the 2D location of the caption within the y-axis; and
- shifting the caption for the left viewpoint video to appear at the first location within the x-y coordinate system and the caption for the right viewpoint video to appear at the second location within the x-y coordinate system such that:
  (i) the first location is different from the second location;
  (ii) the first location is different from the 2D location; and
  (iii) the second location is different from the 2D location.

10. The method of claim 9 wherein spatially reduced left and right images are combined into a single frame to convey the separate left viewpoint video image and right viewpoint video image.

11. The method of claim 9 wherein spatially interleaved left and right images are combined into a single frame to convey the separate left viewpoint video image and right viewpoint video image.

12. The method of claim 9 wherein temporally interleaved left and right images are carried as alternate frames to convey the separate left viewpoint video image and right viewpoint video image.

13. The method of claim 9 further comprising shifting the captions for the left and right viewpoint images relative to the predefined 2D coordinates by an equal amount.

14. The method of claim 13 further comprising shifting the captions for the left and right viewpoint images such that the captions for the left and right viewpoint images appear within the stereoscopic, 3D video to be aligned within the screen at the location specified by predefined 2D coordinates.

15. The method of claim 14 further comprising shifting the captions for the left and right viewpoint images such that the captions for the left and right viewpoint images appear in front of the stereoscopic, 3D video.

16. The method of claim 15 further comprising shifting the captions for the left and right viewpoint images such that an x value of the first placement location is greater than the initial x positional value specified by the predefined 2D coordinates and an x value of the second placement location is less than the initial x positional value specified in the predefined 2D coordinates.

17. The method of claim 13 further comprising shifting the captions for the left and right viewpoint images such that x and y values for the first and second locations are shifted relative to the initial x and y positional values in proportion to a distance by which the caption appears to be in front of the stereoscopic, 3D video.

18. The method of claim 13 further comprising the initial x and y positional values being defined to position the caption within a 2D output.

19. The method of claim 9 further comprising:
- determining the predefined 2D coordinates specifying the initial x and y positional values from placement information defined according to ANSI-CEA-708.

20. A system for generating graphical elements over a multiplexed, stereoscopic 3D image comprising;
- a graphics generator for generating the graphical elements over the video;
- a combiner for adding the graphical representations to each of a left viewpoint image and a right viewpoint image included within separate image frames used by an output device to render the 3D image;
- wherein the graphics generator instructs the combiner with a first coordinate position and a second coordinate position to respectively instruct the combiner as to where the graphical elements are to be added to the left and right viewpoint images; and
- wherein the graphics generator determines the first and second coordinate positions based on a predefined two-dimensional (2D) coordinate position specified for the graphical elements within a transport stream used to transport the left and right viewpoint images, the 2D coordinate position being different than both of the first and second coordinate positions
- the predefined 2D coordinate position specifying an initial x positional value and an initial y positional value for placement of the graphical elements at a two-dimensional (2D) location within a screen of the display device, the screen defined by an x-y coordinate system where an x-axis defines a width of the screen and a y-axis defines a height of the screen, the initial x positional value defining the 2D location of the caption within the x-axis and the initial y positional value defining the 2D location of the caption within the y-axis; and wherein the graphics generator shifts the graphical elements for the left viewpoint images to appear at the first coordinate position within the x-y coordinate system and the graphical elements for the right viewpoint images to appear at the second coordinate position within the x-y coordinate system such that:
(i) the first coordinate position is different from the second coordinate position;
(ii) the first coordinate position is different from the 2D location; and
(iii) the second coordinate position is different from the 2D location.

21. The system of claim 20 wherein the graphics generator determines the first and second coordinate positions relative to a desired amount of parallax for the graphical elements, the amount of parallax being defined relative to the screen plane of the output device such that the graphical elements appears to be forward or rearward of the screen plane, the graphics generator shifting the first and second coordinate positions relative to the predefined 2D coordinate position by an equal amount and in proportional to the desired amount of parallax, the first coordinate position being shifted in a direction opposite to the shifting of the second coordinate position.

22. The system of claim 20 wherein the graphics generator determines the first and second coordinate positions as a function of whether the output device relies upon one of a side-by-side and an above-and-below spatial reduction of the left and right viewpoint images, and as a function thereof, shifts each of the first and second coordinate positions to differ from the 2D coordinate position by an equal amount.

23. The system of claim 20 wherein the predefined 2D coordinate position is defined according to ANSI-CEA-708.

* * * * *